A. G. PAUL.
HEATING SYSTEM.
APPLICATION FILED MAY 15, 1900.
1,045,602.
Patented Nov. 26, 1912.
3 SHEETS—SHEET 1.
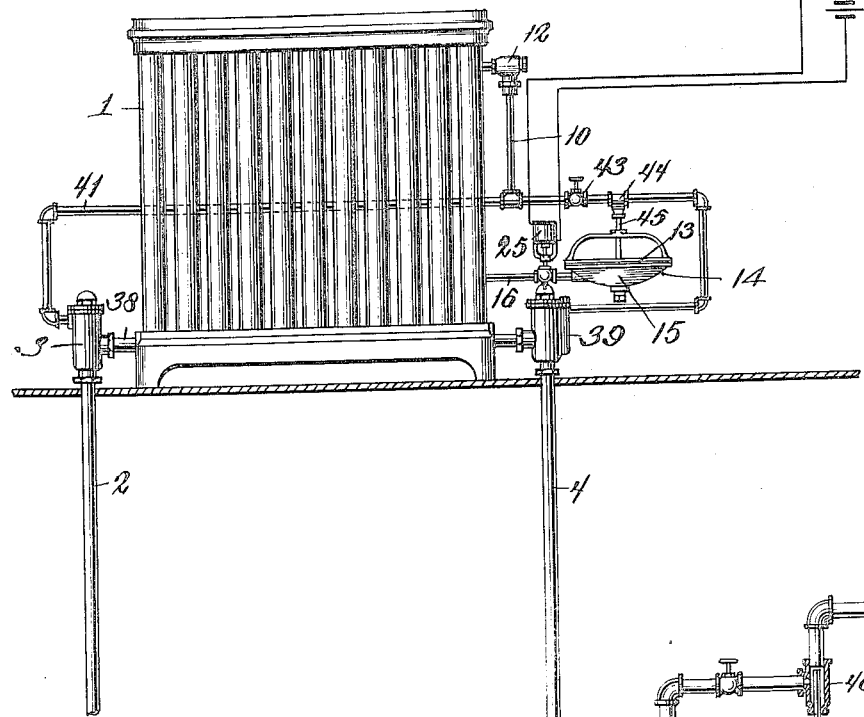
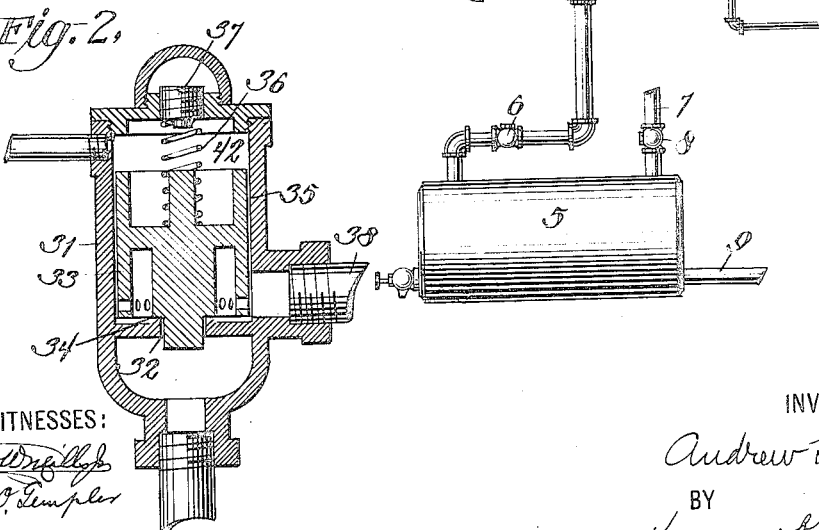
WITNESSES:
INVENTOR,
Andrew G. Paul,
BY
Kenyon & Kenyon
ATTORNEYS.

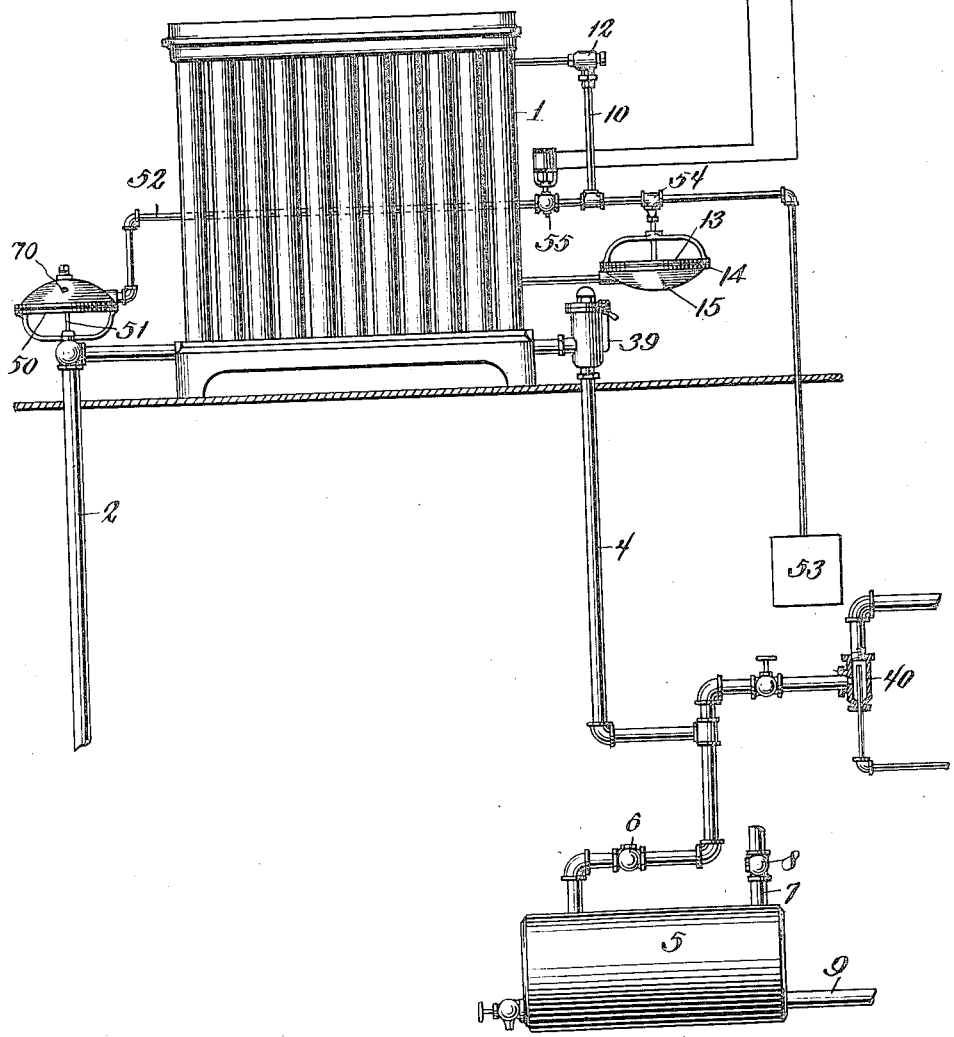

A. G. PAUL.
HEATING SYSTEM.
APPLICATION FILED MAY 15, 1900.
1,045,602.
Patented Nov. 26, 1912.
3 SHEETS—SHEET 3.
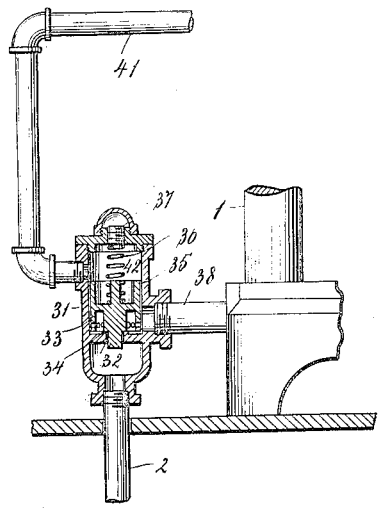
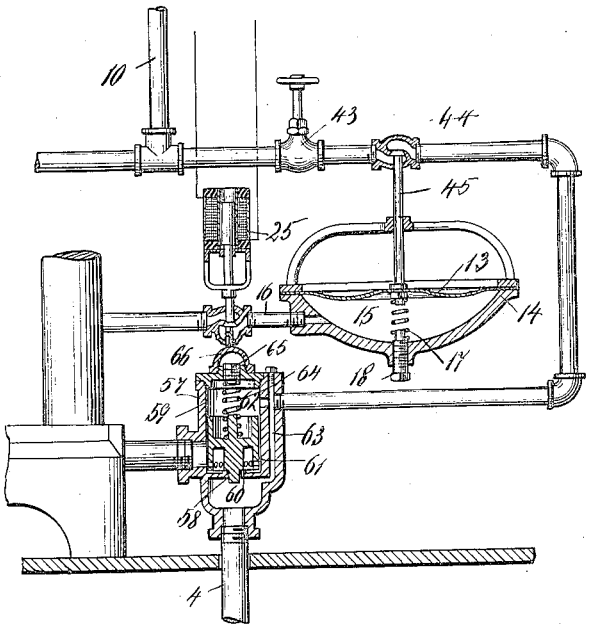
Fig. 6.
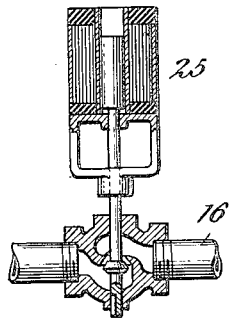
Fig. 4.
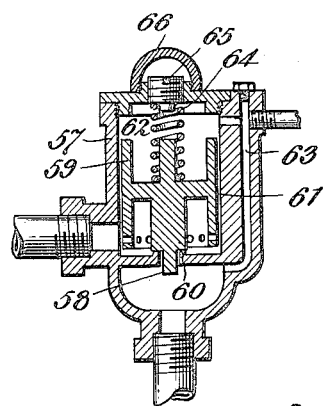
Fig. 5.
WITNESSES:
Geo. M. Harris.
John O. Sempler.
INVENTOR
Andrew G. Paul
BY Kenyon & Kenyon
HIS ATTORNEYS.

UNITED STATES PATENT OFFICE.

ANDREW G. PAUL, OF BOSTON, MASSACHUSETTS.

HEATING SYSTEM.

1,045,602.  Specification of Letters Patent.  Patented Nov. 26, 1912.

Application filed May 15, 1900. Serial No. 16,810.

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired, and it consists in an improved construction and arrangement of the parts of such system.

The invention consists in the combination of a heater or radiator, a valve for controlling the operation of the same, a motor connected with said valve, the valve casing having a fluid pressure chamber on one side of said motor, a suitable vent for said chamber, a fluid pressure device adapted either to supply the fluid pressure chamber with fluid under pressure, or to exhaust the pressure from said chamber, a pipe connecting the device with the fluid pressure chamber, and a second motor controlling said pipe and connected with a heater or radiator so as to be operated by the pressure therein.

In the best form of my invention, the first mentioned motor is provided with an equalizing passage connecting the chambers on opposite sides of the motor whereby when the fluid pressure device is cut off from the fluid pressure chamber, the pressure in the chambers on opposite sides of the motor will be equalized through the equalizing passage. In the best form of my invention also, I employ an exhausting device for exhausting the pressure from the fluid pressure chamber. This part of my invention also contemplates the employment of a thermostat to be placed in any desirable position, and adapted to control the pipe or passage connecting the fluid pressure chamber of the second motor with the heater or radiator.

My invention also consists in other features of construction and combinations of parts hereinafter described and claimed.

Similar numbers indicate similar parts in the different figures.

Figure 1 shows one form of my invention in which the exhauster is connected with the discharge pipe, and the fluid pressure chamber of the supply valve is also connected with the discharge pipe, and the discharge pipe is provided with a valve having separate passages for air and the water of condensation, and in which the pipe connecting the fluid pressure chamber of the supply valve with the discharge pipe is controlled by a piston operated by the pressure in the radiator; Fig. 2 is a sectional view of the supply valve shown in Fig. 1; Fig. 3 shows another form of my invention; Fig. 4 is a detail of the solenoid valve shown in Fig. 1; Fig. 5 is a detail view of the discharge valve 39; Fig. 6 is a detail view of the supply valve, the discharge valve, and means for causing the same to operate.

1 is a heater or radiator of any suitable form.

2 is the supply pipe.

3 is a supply valve.

4 is the discharge pipe leading to the tank or reservoir 5.

6 is a check valve on the discharge pipe.

7 is a vapor pipe provided with any suitable form of valve 8.

9 is a pipe through which the water may be discharged or pumped to the boiler or discharged in any other suitable manner.

10 is an air pipe connected with the exhauster and with any suitable form of air valve 12.

13 is a motor made in the form of a diaphragm and supported in any suitable manner by the casing 14.

15 is a fluid pressure chamber connected by means of the pipe 16 with the radiator.

24 is a thermostatic device of any suitable form adapted to be placed upon the wall or in any other position, and connected in any suitable way with a solenoid valve 25 on the pipe 16.

31 is a suitable casing provided at its lower part with a supply port 32.

33 is a piston provided at its lower end with a supply valve 34 adapted to close the supply port. The piston 33 is made somewhat smaller than the casing 31, so as to leave an equalizing passage 35 between the piston and the wall of the casing, the equalizing passage operating as a vent for the fluid pressure chamber 42 which is above the piston.

36 is a coiled spring adapted to press upon the upper end of the piston, and the tension of this spring can be regulated by the screw 37 screwing into the upper part of the casing. 38 is the pipe connecting this valve with the radiator.

39 is a valve on the discharge pipe having separate passages for the escape of the air and water of condensation. The special form of this valve is shown and claimed in my Patent No. 771,744 dated Oct. 4, 1904. I do not claim it in this application separately. The construction of this valve is shown in Fig. 5.

40 is an exhauster connected with the discharge pipe.

41 is a pipe connecting the fluid pressure chamber 42 of the supply valve with the discharge pipe, through and by means of the side passage or air passage of the discharge valve 39. The pipe 41 is provided with an ordinary hand valve 43 by means of which the pipe may be shut off.

44 is a valve in the pipe 41 which is controlled by the diaphragm 13 through and by means of the connecting rod 45. In this form of apparatus the air pipe 10 is connected with the pipe 41 in the manner shown.

The operation of this form of my invention is as follows: Assuming that the valve 25 is open, when the pressure in the radiator falls below the desired or predetermined point, the diaphragm 13 is moved so as to open the valve 44 in the pipe 41. With the valve 25 operated by the thermostat being open and the valve 44 being open, the exhauster 40 operating through the pipe 41 decreases the pressure in the fluid pressure chamber 42 and lifts the piston 33, thereby opening the supply port 32 and admitting the heating vehicle to the radiator. When the pressure in the radiator increases to the desired or predetermined point, the valve 44 is closed by the diaphragm 13. The fluid in the chamber of the supply valve below the piston 33 escapes through the equalizing passage 35 or vent into the fluid pressure chamber 42. When the pressures in these two chambers are sufficiently equalized the piston 33 falls and the supply port is closed. At the same time the air and water are drawn out positively and automatically through the valve 39. By connecting the air pipe 10 with the pipe 41 in the manner shown, when the valve 44 is opened the air is removed from the radiator through the pipe 10 at the same time that the supply valve is opened. The removal of air through the pipe 41 is stopped when the supply valve is closed. The thermostat 24 and the valve 25 control the pipe 16 in the manner and for the purpose already set forth.

The construction of the valve 39 is shown in Fig. 5 in which 57 is the valve casing, 58 is a port at its lower end for the discharge of the water, 59 is a piston or pressure motor provided at its lower end with a valve 60 adapted to close the port 58, 61 is a passage for air or gas or vapor between the piston and the wall of the casing, 62 is a fluid pressure chamber above the piston, 63 is a passage in the casing connecting the fluid pressure chamber with the discharge pipe beyond the discharge port 58, 64 is a spring one end of which bears against the upper side of the piston and the other end of which bears against the lower surface of a screw 65 by means of which screw the tension of the spring can be varied and adjusted, and 66 is a cap adapted to cover and protect the screw 65.

In Fig. 3 another form of my improved system is shown, in which the parts are the same as already described with the following differences: 50 is a diaphragm controlling the supply valve through and by means of a rod 51. 52 is a pipe leading from the fluid pressure chamber of the diaphragm to a separate exhauster 53. The pipe 52 is provided with a valve 54 which is controlled by the diaphragm 13 in the manner already described. The air pipe 10 is connected with the pipe 52 as shown, and the pipe 52 between this connection and the supply valve is provided with a valve 55 operated by thermostat 56. The discharge pipe is provided with the valve 39 already described, and the exhauster 40. The operation of this form of my invention is as follows: Assuming that the valve 55 is open, when the pressure in the radiator rises above the desired or predetermined point, the valve 54 is closed. Some suitable vent 70 is provided in connection with the fluid pressure chamber of the diaphragm 50 by means of which, under these conditions, the pressure is equalized on both sides of the diaphragm 50, and the supply valve is thereby shut. This vent can be provided by making an air hole or pin hole through the casing which supports the diaphragm 50. When the pressure falls in the radiator below the desired or predetermined point, the valve 54 is opened and the diaphragm 50 is caused to open the supply valve and admit the heating vehicle. The thermostat 56 controls the valve 55 and thereby controls the operation of the supply valve in the manner already fully explained. The valve 55 is constructed like the valve 25, see Fig. 4.

Some of the advantages secured by my invention are as follows: The heat imparted by the system is accurately and nicely controlled, the pressure of the heating vehicle in the system or heater serving to control or operate at any predetermined point a valve or other controlling means by which the effective heating work of the system is regulated. To this regulation of the system is also added a further and additional regulation secured by the thermostat which is placed upon the wall of the room, or in any other position where it will be exposed to the regulating temperature. At the same time the air and water of condensation are positively and thoroughly removed from the system. The invention is simple in construction and both accurate and economical in its operation. It furnishes means for automatically controlling the heat of the system or the work done thereby, not only with nice precision, but at the same time within wide limits.

What I claim as new and desire to secure by Letters Patent, is:

1. In a heating system the combination of a heater or radiator, a valve for controlling the operation of the same, a casing, a motor connected with said valve, the said casing being provided with a fluid pressure chamber on one side of the motor, a vent for said chamber, a fluid pressure device, a pipe connecting the fluid pressure device with the fluid pressure chamber, a valve in said pipe, a second motor controlling said valve and connected with the heater or radiator so as to operate by the pressure therein, substantially as set forth.

2. In a heating system the combination of a heater or radiator, a valve for controlling the operation of the same, a casing, a motor connected with said valve, said casing being provided with a fluid pressure chamber on one side of the motor, a chamber on the opposite side of the motor, and an equalizing passage connecting the chambers on opposite sides of the motor, a fluid pressure device, a pipe connecting the fluid pressure device with the fluid pressure chamber, a valve in said pipe, a second motor controlling said valve and connected with the heater or radiator so as to be operated by the pressure within the radiator, substantially as set forth.

3. In a heating system the combination of a heater or radiator, a valve for controlling the operation of the same, a casing, a motor connected with said valve, the said casing being provided with a fluid pressure chamber on one side of the motor, and with a vent for said chamber, an exhausting device, a pipe connecting the exhausting pipe with the fluid pressure chamber, a valve in said pipe, a second motor controlling said valve and connected with a heater or radiator so as to be operated by the pressure therein, substantially as set forth.

4. In a heating system the combination of a heater or radiator, a valve for controlling the operation of the same, a casing, a motor connected with said valve, said casing being provided with a fluid pressure chamber on one side of the motor, a chamber on the opposite side of the motor and an equalizing passage connecting the chambers on opposite sides of the motor, an exhausting device, a pipe connecting the exhausting device with the fluid pressure chamber, a valve in said pipe, a second motor controlling said valve and connected with a heater or radiator so as to be operated by the pressure therein, substantially as set forth.

5. In a heating system the combination of a heater or radiator, a valve for controlling the operation of the same, a casing, a motor connected with said valve, the said casing being provided with a fluid pressure chamber on one side of the motor, a chamber on the opposite side of the motor and a vent for said fluid pressure chamber, a fluid pressure device, a pipe connecting the fluid pressure device with the fluid pressure chamber, a valve in said pipe, a second motor controlling said valve, the second motor being provided with a fluid pressure chamber on one side thereof, a passage connecting the said last-mentioned fluid pressure chamber with the heater or radiator, a valve in said passage, and a thermostat adapted to control said valve in said passage, substantially as set forth.

6. In a heating system the combination of a heater or radiator, a valve for controlling the operation of the same, a casing, a motor connected with the said valve, said casing being provided with fluid pressure chambers on opposite sides of said motor, and with an equalizing passage connecting said chambers, a fluid pressure device, a pipe connecting the fluid pressure device with one of the fluid pressure chambers, a valve in said pipe, a second motor controlling said valve, the second motor being provided with a fluid pressure chamber on one side thereof, a pipe connecting the said last mentioned fluid pressure chamber with the heater or radiator, a valve in said pipe, and a thermostat adapted to control said last mentioned valve, substantially as set forth.

7. In a heating system the combination of a heater or radiator, a valve for controlling the operation of the same, a casing, a motor connected with said valve, the said casing being provided with a fluid pressure chamber on one side of the motor, and with a vent for said chamber, an exhausting device, a pipe connecting the exhausting device with the fluid pressure chamber, a valve in said pipe, a second motor controlling said valve, the second motor being provided with a fluid pressure chamber on one side thereof, a pipe connecting the said last mentioned fluid pressure chamber with the heater or radiator, a valve in said pipe, and a thermostat adapted to control said last mentioned valve, substantially as set forth.

8. In a heating system the combination of a heater or radiator, a supply pipe, a valve in the supply pipe, a casing, a motor connected with said valve, the casing being provided with a fluid pressure chamber on one side of the motor, and with a vent for said chamber, a fluid pressure device, a pipe connecting the fluid pressure device with the fluid pressure chamber, a valve in said pipe, a second motor controlling said valve and connected with the heater or radiator, so as to be operated by the pressure therein, substantially as set forth.

9. In a heating system the combination of a heater or radiator, a supply pipe, a valve in the supply pipe, a motor connected with said valve, the motor being provided with fluid pressure chambers on opposite sides thereof, and with an equalizing passage connecting said chambers, a fluid pressure device, a pipe connecting the fluid pressure device with one of the fluid pressure chambers, a valve in said pipe, a second motor controlling said valve and connected with the heater or radiator so as to be operated by the pressure therein, substantially as set forth.

10. In a heating system the combination of a heater or radiator, a supply pipe, a valve in the supply pipe, a casing, a motor connected with said valve, the said casing being provided with a fluid pressure chamber on one side of said motor, and with a vent for said chamber, a fluid pressure device, a pipe connecting the fluid pressure device with the fluid pressure chamber, a valve in said pipe, a second motor controlling said valve, the second motor being provided with a fluid pressure chamber on one side thereof, a pipe connecting the said last mentioned fluid pressure chamber with the heater or radiator, a valve in said pipe, and a thermostat adapted to control said last mentioned valve, substantially as set forth.

11. In a heating system the combination of a heater or radiator, a supply pipe, a valve in the supply pipe, a casing, a motor connected with said valve, the said casing being provided with fluid pressure chambers on opposite sides of the motor, and with an equalizing passage connecting said chambers, a fluid pressure device, a pipe connecting the fluid pressure device with one of the fluid pressure chambers, a valve in said pipe, a second motor controlling said valve, the second motor being provided with a fluid pressure chamber on one side thereof, a pipe connecting the said last mentioned fluid pressure chamber with the heater or radiator, a valve in said pipe, and a thermostat adapted to control said last mentioned valve, substantially as set forth.

12. In a heating system the combination of a heater or radiator, a supply pipe, a valve in the supply pipe, a casing, a motor connected with said valve, the casing being provided with fluid pressure chambers on opposite sides of the motor, and with an equalizing passage connecting said chambers, and a pipe connecting one of the fluid pressure chambers with the heater or radiator, a discharge pipe connected with the other fluid pressure chamber, a valve in said discharge pipe having a suitable valve casing, a port for the discharge of the water, a piston controlling the said port, the said casing being provided with a fluid pressure chamber on one side of the piston, an air passage connecting the said last-mentioned fluid pressure chamber with the chamber on the other side of said piston, and a passage connecting the last-mentioned fluid pressure chamber with the discharge pipe beyond the discharge port, and an exhausting device connected with the discharge pipe, substantially as set forth.

In testimony whereof, I have signed my name to this specification, in the presence of two subscribing witnesses.

ANDREW G. PAUL.

Witnesses:
 THOMAS K. PETERS,
 NANNIE FINLEY.